(12) United States Patent
Fujita

(10) Patent No.: US 7,964,316 B2
(45) Date of Patent: Jun. 21, 2011

(54) FUEL CELL SYSTEM AND METHOD OF STOPPING THE SAME

(75) Inventor: Nobuo Fujita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 716 days.

(21) Appl. No.: 11/991,471

(22) PCT Filed: Nov. 16, 2006

(86) PCT No.: PCT/JP2006/322864
§ 371 (c)(1),
(2), (4) Date: Mar. 5, 2008

(87) PCT Pub. No.: WO2007/066485
PCT Pub. Date: Jun. 14, 2007

(65) Prior Publication Data
US 2009/0148728 A1    Jun. 11, 2009

(30) Foreign Application Priority Data
Dec. 5, 2005   (JP) .................................. 2005-350551

(51) Int. Cl.
*H01M 8/02*   (2006.01)
*H01M 8/04*   (2006.01)

(52) U.S. Cl. ........................................ 429/429; 429/444

(58) Field of Classification Search .................. 429/415, 429/429, 444, 428, 442, 414, 314, 430, 433, 429/440
See application file for complete search history.

(56) References Cited

U.S. PATENT DOCUMENTS
2005/0112424 A1   5/2005   Hirano et al.

FOREIGN PATENT DOCUMENTS

| JP | 2003-178782 A | 6/2003 |
|---|---|---|
| JP | 2005-11779 A | 1/2005 |
| JP | 2005-158282 A | 6/2005 |
| JP | 2005-158426 A | 6/2005 |
| JP | 2005/209635 A | * 8/2005 |

OTHER PUBLICATIONS

Machine translation of: JP 2005/209635 A, Hayashi et al., Aug. 4, 2005.*
Abstract of: JP 2005/209635 A, Hayashi et al., Aug. 4, 2005.*
Machine Translation of: JP 2005/011779 A, Sugano Y., Jan. 13, 2005.*

* cited by examiner

*Primary Examiner* — Jonathan Crepeau
*Assistant Examiner* — Kenneth Douyette
(74) *Attorney, Agent, or Firm* — Kenyon & Kenyon LLP

(57) ABSTRACT

A fuel cell system includes a fuel cell body, a gas passage supplying reactive gas to the fuel cell body and discharging the reactive gas from the fuel cell body, and an adjustment part adjusting a flowing condition of the reactive gas in the gas passage. The fuel cell system includes at least two scavenging passages which scavenge a part of the gas passage, wherein a first scavenging passage is formed to contain the fuel cell body and a second scavenging passage is formed to bypass the fuel cell body.

10 Claims, 3 Drawing Sheets

US 7,964,316 B2

FUEL CELL SYSTEM AND METHOD OF STOPPING THE SAME

This is a 371 national phase application of PCT/JP2006/322864 filed 16 Nov. 2006, claiming priority to Japanese Patent Application No. 2005-350551 filed 5 Dec. 2005, the contents of which are incorporated herein by reference.

TECHNICAL FIELD

This invention generally relates to a fuel cell system and a method of stopping the fuel cell system, and more particularly to a fuel cell system which is capable of preventing freezing of its component parts, such as pumps or valves, disposed in a gas passage, and a method of stopping the fuel cell system.

BACKGROUND ART

A fuel cell system is a system in which a fuel gas and an oxidizing agent gas are supplied to a fuel cell via corresponding gas feed passages, and electricity is generated by using an electrochemical reaction of these gases in a fuel cell body.

Water is generated in the fuel cell body by the electrochemical reaction, and the water is discharged from the fuel cell body in a condition that the water is contained in a fuel-off gas (a fuel gas discharged from the fuel cell body) and an oxidizing-agent-off gas (an oxidizing agent gas discharged from the fuel cell body).

Therefore, if the ambient temperature of the system falls to the freezing point or below in a stop state of the fuel cell system, the moisture in the gases remaining in the valves, the piping, etc., arranged in the gas passages of the system, may condense and the component parts of the system may be frozen.

In such a case, there is a possibility that starting the fuel cell system is impossible even if an operation to start the fuel cell system is performed thereafter. Or, there is a possibility that, even if the fuel cell system can be started, it is difficult to perform the normal operation of the fuel cell system. In particular, the freezing of a gas supplying device, such as a pump, would make the supplying of fuel gas or oxidizing agent gas impossible, and considerable time would be needed to put the entire system into operation.

To avoid the problem, there has been proposed a method of removing residual water in which a liquid storing section is arranged at the inlet port or discharge port of a hydrogen pump so that the moisture does not easily remain in the pump chamber of the hydrogen pump, and the inside of the hydrogen pump is scavenged with dry hydrogen gas immediately before occurrence of a system stop. See Japanese Laid-Open Patent Application No. 2003-178782.

There has been also proposed a method of removing residual water in which dry hydrogen gas is supplied to a hydrogen pump at a predetermined timing in a system stop phase and the residual water is discharged, in order to prevent freezing of the hydrogen pump. See Japanese Laid-Open Patent Application No. 2005-158426.

Patent Document 1: Japanese Laid-Open Patent Application No. 2003-178782
Patent Document 2: Japanese Laid-Open Patent Application No. 2005-158426

DISCLOSURE OF THE INVENTION

The Problem to be Solved by the Invention

However, Japanese Laid-Open Patent Applications No. 2003-178782 and No. 2005-158426 take into consideration the freeze proofing action for the hydrogen pump only, but any action for removing the moisture remaining in the fuel cell body or other sections is not taken into consideration.

In order to avoid the problem of freezing on the gas passages of the system including a fuel cell body and/or a hydrogen pump at a time of a system stop, if the method as disclosed in Japanese Laid-Open Patent Applications No. 2003-178782 and No. 2005-158426 is carried out, assuming that the gas passages including the fuel cell body and the hydrogen pump are scavenging passages, the problem arises in that it is difficult to discharge the moisture in the gas passages from the system effectively since the moisture in the fuel cell body flows into the component parts of the system, arranged on the downstream side of the gas flow, such as pumps and/or valves.

According to one aspect of the invention, there is disclosed an improved fuel cell system in which the above-mentioned problem is eliminated.

According to one aspect of the invention, there is disclosed a fuel cell system which prevents freezing of component parts, arranged in the fuel gas and/or oxidizing agent gas passages, such as pumps, effectively at a time of a system startup.

Means for Solving the Problem

In an embodiment of the invention which solves or reduces one or more of the above-mentioned problems, there is disclosed a fuel cell system including a fuel cell body, a gas passage supplying reactive gas to the fuel cell body and discharging the reactive gas from the fuel cell body, and an adjustment part adjusting a flowing condition of the reactive gas in the gas passage, the fuel cell system comprising at least two scavenging passages scavenging a part of the gas passage, wherein a first scavenging passage is formed to contain the fuel cell body, and a second scavenging passage is formed to bypass the fuel cell body.

It should be noted that the adjustment part means a component part of the system arranged at a part of the gas passages supplying and discharging the reactive gas, such as a pump, a valve, a gas/liquid separator, a humidifier, or a piping. At least two scavenging passages are provided in the fuel cell system of the invention, and scavenging in the first scavenging passage including the fuel cell body is performed at a time of a system stop. Thereafter, scavenging in the second scavenging passage that does not contain the fuel cell body is performed. Therefore, it is possible to discharge the residual water from the gas passage concerned efficiently, without being influenced by the moisture discharged from the fuel cell body.

The above-mentioned fuel cell system may be arranged so that each of the first and second scavenging passages contains the same adjustment part. Thereby, it is possible to realize efficient drying of the adjustment part concerned.

The above-mentioned fuel cell system may be arranged so that a part of the gas passage discharging the reactive gas includes a circulation passage which returns, to a part of the gas passage supplying the reactive gas, the discharged reactive gas by using a circulating pump, and each of the first and second scavenging passages contains the circulating pump. By this structure, scavenging in the first scavenging passage containing the fuel cell body is first performed at a time of stopping the fuel cell system, and then, scavenging in the second scavenging passage containing the circulating pump is performed without being influenced by the fuel cell body. Thus, it is possible to realize efficient drying of the circulating pump.

The above-mentioned fuel cell system may be arranged so that the second scavenging passage includes a bypass passage, one end of the bypass passage is connected to a location of the circulation passage between the circulating pump and the part of the gas passage supplying the reactive gas, and the other end of the bypass passage is connected to a location of the circulation passage between the fuel cell body and the circulating pump.

The above-mentioned fuel cell system may be arranged so that at least one of the first and second scavenging passages contains a gas/liquid separator. In this case, the moisture remaining in the reactive gas passage is collected and discharged from the system by the gas/liquid separator, and it is possible to realize efficient drying of the adjustment part.

The above-mentioned fuel cell system may be arranged so that the second scavenging passage is scavenged with fresh reactive gas which is not circulating to the fuel cell body. In this case, the second scavenging passage can be scavenged with dry reactive gas which does not contain moisture, and it is possible to realize efficient drying of the adjustment part.

In an embodiment of the invention which solves or reduces one or more of the above-mentioned problems, there is disclosed a method of stopping the above-mentioned fuel cell system, the method comprising the steps of: performing scavenging in the first scavenging passage before a system stop; and performing scavenging in the second scavenging passage before the system stop. By this method, it is possible to dry the component parts in a condition that they are separated from the fuel cell body after the fuel cell body is dried, and it is possible to realize an efficient drying process.

The above-mentioned method of stopping the fuel cell system may be arranged so that the fuel cell system further comprises a detection unit detecting a temperature at a predetermined location, and, when the temperature detected by the detection unit is less than or equal to a reference value, both scavenging in the first scavenging passage and scavenging in the second scavenging passage are performed. By this method, the above-mentioned steps are performed only when the fuel cell system is placed under the low-temperature environment in which freezing may arise with high possibility, and energy saving of the fuel cell system is attained.

The above-mentioned method of stopping the fuel cell system may be arranged so that, when it is determined that an amount of residual water in the first scavenging passage is less than or equal to a reference value, the step of performing scavenging in the first scavenging passage is shifted to the step of performing scavenging in the second scavenging passage. Thereby, the component parts concerned can be dried certainly and efficiently.

Effects of the Invention

According to the embodiments of the fuel cell system of the invention, the moisture remaining in the gas passage can be discharged efficiently and occurrence of freezing of a pump and other component parts in a stop state of the fuel cell system can be prevented. Therefore, it is possible to start the fuel cell system promptly at a next time of system startup even under low-temperature environment.

Figure 1:
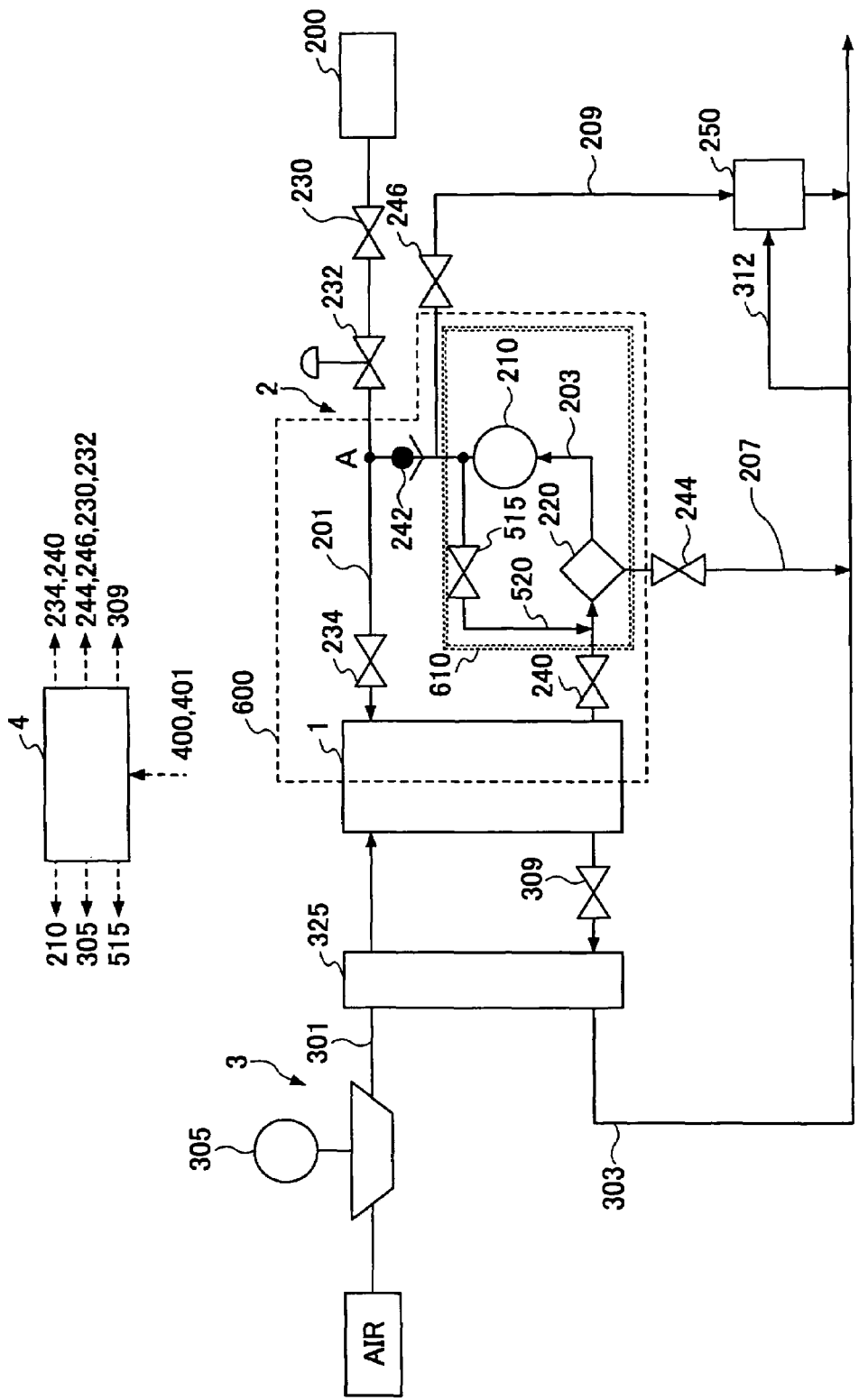
FIG. 1 is a diagram showing the composition of a fuel cell system in an embodiment of the invention.

DESCRIPTION OF REFERENCE NUMERALS 1 fuel cell body
2 fuel-gas passage
3 oxidizing-agent-gas passage
4 control unit
200 high-pressure hydrogen tank
201 fuel-gas feed passage
203 circulation passage
207 first branch passage
209 second branch passage
210 hydrogen pump
220 gas/liquid separator for fuel-off gas
230, 234, 240, 244, 246 solenoid valves
232 pressure reduction control valve
242 non-return valve
250 dilution device
301 oxidizing-agent-gas feed passage
303 oxidizing-agent-off gas discharge passage
305 compressor
309 solenoid valve
325 humidifier
312 oxidizing-agent-off gas branch passage
400 pressure measurement result
401 temperature measurement result
515, 525 solenoid valves
520, 530 bypass passages
600 first scavenging passage
610 second scavenging passage

BEST MODE FOR CARRYING OUT THE INVENTION

A description will now be given of the embodiments of the invention with reference to the accompanying drawings.

In the following, an embodiment of the fuel cell system in which the invention is applied to the fuel-gas supplying and discharging (or circulation) passages will be explained. However, the invention may be applied also to the oxidizing-agent-gas passages of the fuel cell system.

FIG. 1 shows the composition of a fuel cell system in an embodiment of the invention. This system has a fuel cell body 1, and electric power generated in the fuel cell body 1 may be used as a source of operation of an automotive vehicle, for example.

The fuel cell system further includes a fuel-gas passage 2 for circulating a fuel gas within the fuel cell system, an oxidizing agent gas passage 3 for circulating an oxidizing agent gas (air) within the fuel cell system, and a control unit 4. In the following, an example of a fuel cell system which uses hydrogen gas as the fuel gas being supplied to the fuel cell will be described.

The fuel-gas passage 2 includes a fuel-gas feed passage 201 for supplying a fuel gas from a source of hydrogen fuel, such as a high-pressure hydrogen tank 200, to the fuel cell body 1, and a fuel-off gas discharge passage 203 for discharging a fuel-off gas from the fuel cell body 1.

The fuel-off gas discharge passage 203 is substantially a circulation passage, and this passage connects the fuel cell body 1 to the fuel-gas feed passage 201 via a gas/liquid separator 220 and a hydrogen pump 210 which will be mentioned later. The fuel-off gas discharge passage 203 may be also called circulation passage 203. A first branch passage 207 and a second branch passage 209 are connected to the circulation passage 203.

A normally-closed solenoid valve 230 is arranged at a discharge port of the high-pressure hydrogen tank 200, and a pressure reduction control valve 232 and a normally-closed solenoid valve 234 are arranged in the fuel-gas feed passage 201 of the fuel-gas passage 2 at a position apart from the fuel cell body 1 and at a position near the fuel cell body 1, respectively.

On the other hand, in the circulation passage 203, a normally-closed pressure reduction control valve 240, a gas/liquid separator 220, a hydrogen pump 210, and a non-return valve 242 are arranged in this order at positions along the circulation passage 203 respectively that are arrayed apart from the fuel cell body 1.

The first branch passage 207 is connected to the gas/liquid separator 220 via the normally-closed solenoid valve 244. The second branch passage 209 is connected to the circulation passage 203 at an intermediate point between the discharge port of the hydrogen pump 210 and the junction point A of the circulation passage 203 and the fuel-gas feed passage 201.

A normally-closed solenoid valve (purge valve) 246 and a dilution device 250 are arranged in the second branch passage 209, and the other end of the second branch passage 209 at the discharge port of the dilution device 250 is connected to an oxidizing-agent-off gas discharge passage 303 which will be mentioned later. The other end of the first branch passage 207 is also connected to the oxidizing-agent-off gas discharge passage 303.

A bypass passage 520, branched from the circulation passage 203, is connected to the circulation passage 203 at an intermediate point between the hydrogen pump 210 and the junction point A (the junction point of the circulation passage 203 and the fuel-gas feed passage 201). This bypass passage 520 is again connected to the circulation passage 203 at a position between the solenoid valve 240 and the gas/liquid separator 220 via a solenoid valve 515.

On the other hand, the oxidizing agent gas passage 3 contains an oxidizing agent gas feed passage 301 for supplying an oxidizing agent gas to the fuel cell body 1, and an oxidizing-agent-off gas discharge passage 303 for discharging an oxidizing-agent-off gas from the fuel cell body 1.

A compressor 305 and a humidifier 325 are arranged in the oxidizing agent gas feed passage 301. The humidifier 325 is arranged in the oxidizing-agent-off gas discharge passage 303, and a solenoid valve (air escape valve) 309 is arranged between the humidifier 325 and the fuel cell body 1.

The oxidizing-agent-off gas discharge passage 303 includes an oxidizing-agent-off gas branch passage 312 arranged at a downstream side position from the junction point of the oxidizing-agent-off gas discharge passage 303 and the branch passage 207, and this oxidizing-agent-off gas branch passage 312 is connected to the dilution device 250.

Alternatively, the dilution device 250 and the oxidizing-agent-off gas branch passage 312 may be omitted from the fuel cell system.

The control unit 4 controls the respective valves 234, 240, 244, 246, 230, 232, 309, the hydrogen pump 210, and the compressor 305 in response to a pressure measurement result 400 and a temperature measurement result 401 received from a pressure sensor and a temperature sensor, respectively, which are arranged at predetermined positions of the above-mentioned passages. Moreover, the control unit 4 controls a solenoid valve 515 which will be mentioned later. For the sake of convenience of illustration, the control lines between the control unit and the component parts are omitted in the diagram of FIG. 1.

Next, a description will be given of a normal flow of oxidizing agent gas. In a normal operation of the fuel cell system, the compressor 305 is driven by the control unit 4, so that the atmospheric air is captured as oxidizing agent gas, passes through the oxidizing agent gas feed passage 301, and is supplied to the fuel cell body 1 via the humidifier 325.

The supplied oxidizing agent gas is consumed by the electrochemical reaction in the fuel cell body 1, and then discharged from the fuel cell body 1 as oxidizing-agent-off gas. The discharged oxidizing-agent-off gas passes through the oxidizing-agent-off gas discharge passage 303, and it is discharged to the outside of the fuel cell system.

Next, a description will be given of a flow of hydrogen gas. In a normal operation of the fuel cell system, the solenoid valve 230 is opened by the control unit 4, so that hydrogen gas from the high-pressure hydrogen tank 200 is entered, and passes through the fuel-gas feed passage 201, and its pressure is then reduced by the pressure reduction control valve 232. Thereafter, the hydrogen gas is supplied to the fuel cell body 1 via the solenoid valve 234.

The supplied hydrogen gas is consumed by the electrochemical reaction in the fuel cell body 1, and it is then discharged from the fuel cell body 1 as hydrogen-off gas. After it passes through the circulation passage 203 and the moisture is removed by the gas/liquid separator 220, the discharged hydrogen-off gas is returned to the fuel-gas feed passage 201 via the hydrogen pump 210, and is again supplied to the fuel cell body 1.

Since the non-return valve 242 is arranged between the hydrogen pump 210 and the junction point A of the fuel-gas feed passage 201 and the circulation passage 203, the hydrogen-off gas which is circulated does not flow backwards.

Normally, the solenoid valves 244 and 246 in the first and second branch passages 207 and 209 are set in the closed state. If these valves are set in the opened state when needed, the moisture-containing gas processed by the gas/liquid separator 220 and the hydrogen-off gas that does not need circulation will be discharged from each o branch passage. These liquids and/or gases are discharged out of the fuel cell system via the oxidizing-agent-off gas discharge passage 303.

Next, a description will be given of the action for the freeze proofing of a component part of the fuel cell system in an embodiment of the invention. In the following, the action for the freeze proofing of a hydrogen pump of the fuel cell system will be described as a typical example.

Generally, when a fuel cell system is stopped under a low temperature environment, the component parts of the system (a pump, various valves, a gas/liquid separator, a humidifier, a piping, etc.) are frozen by condensation of the moisture-containing gas remaining in the system. This may cause the difficulty in starting the fuel cell system at a next time of system startup. A conceivable method of avoiding the freezing of such component parts is that a fuel-off gas or the like is supplied to the fuel-gas passage 2 and the residual water is caused to be discharged before a system stop or during a system stop.

For example, a conceivable measure for drying the hydrogen pump 210 is to constitute one scavenging passage (which will be mentioned as first scavenging passage 600 later) for the entire fuel-gas passage including the fuel cell body 1.

However, in this case, if circulated scavenging of hydrogen-off gas is repeated until it is checked that the amount of residual water is less than or equal to a reference value, the residual water from the fuel cell body enters into the hydrogen pump continuously. Thus, scavenging operation will be repeated until both drying of the fuel cell body and drying of the hydrogen pump are completed.

Normally, more time is needed for removing residual water of the hydrogen pump, when compared with the cases of other component parts. If the conceivable method mentioned above is used, the drying efficiency of the hydrogen pump will be low and considerable time will be needed before a system stop.

To obviate the problem, the fuel cell system stopping method according to the invention is arranged so that two scavenging passages (first and second scavenging passages) are constituted, and, prior to a system stop under a low temperature environment, two steps of moisture removing operation are performed. In the first step of moisture removing operation, moisture removing in the first scavenging passage containing the fuel cell body 1 is performed so that the fuel cell body 1 is dried. After this, in the second step of moisture removing operation, moisture removing operation of the hydrogen pump 210 in the second scavenging passage that does not contain the fuel cell body 1 is performed. Therefore, it is possible to perform moisture removing of the hydrogen pump efficiently.

A detailed description will be given of the above-mentioned method of two-step moisture removing operation according to the invention. In the first step, the fuel-off gas is circulated within a first scavenging passage 600 which is indicated by the dotted line in FIG. 1. Namely, the fuel-off gas is circulated by using the hydrogen pump 210 in the path which contains the circulation passage 203 between the fuel cell body 1 and the hydrogen pump 210, the hydrogen pump 210, and the fuel-gas feed passage 201 between the point A and the fuel cell body 1. And recovery removing of the residual water within the system is performed by using the gas/liquid separator 220. In this step, the pressure reduction control valve 234 and the solenoid valve 240 are set in the opened state, and the solenoid valves 230, 232, 515 are set in the closed state. The moisture remaining in the fuel cell body 1 is fully discharged by the circulation operation of the fuel-off gas.

Next, in the second step, in a second scavenging passage 610, as indicated by the double dotted line in FIG. 1, which bypasses the fuel cell body 1 the fuel-off gas is circulated by using the hydrogen pump 210, so that the residual water is removed by the gas/liquid separator 220. In this step, the pressure reduction control valve 234 and the solenoid valve 240 is set in the closed state and the solenoid valve 515 is set in the opened state. Accordingly, the hydrogen pump 210 can be dried efficiently, without being influenced by the fuel cell body 1.

Figure 2:
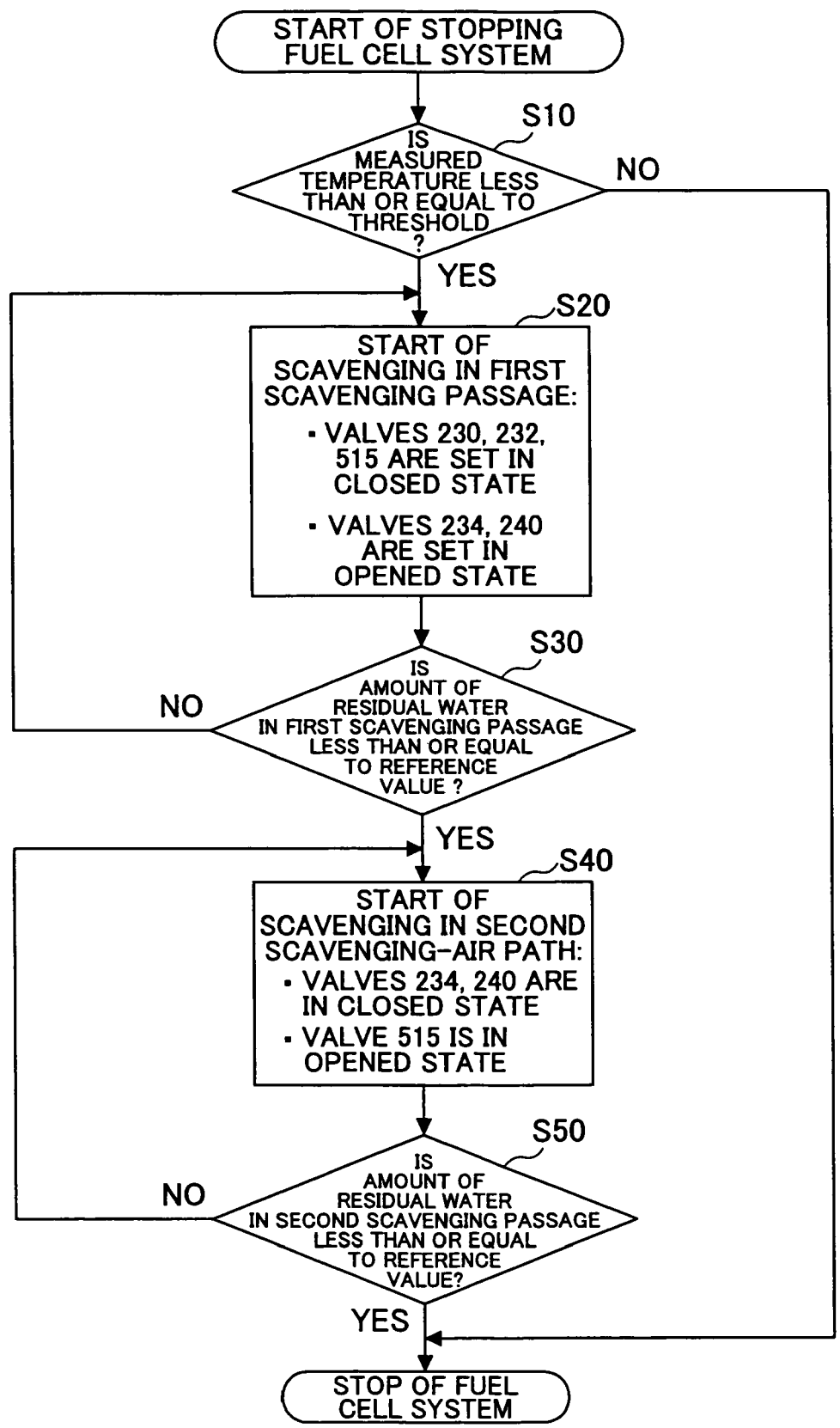
FIG. 2 is a flowchart for explaining operation of the fuel cell system in this embodiment at a start of stopping the fuel cell system.

FIG. 2 is a flowchart for explaining operation of the fuel cell system in this embodiment at a start of stopping the fuel cell system.

In step S10, an outside-air temperature or a piping temperature (for example, a temperature of any piping in the fuel-gas passages 2 shown in FIG. 1) is measured by using a detection unit, such as a temperature sensor, and the control unit 4 determines whether the moisture removing operation for freeze proofing is required, based on the result of comparison of the measured temperature 401 and a predetermined threshold.

When the measured temperature 401 is less than or equal to the threshold, the control unit 4 determines that the moisture removing operation in the fuel-gas passage 2 is required. In this case, the control progresses to the next step S20.

On the other hand, when the measured temperature 401 exceeds the threshold, the command for moisture removing operation is not outputted by the control unit 4, and the fuel cell system is stopped without performing any special operation. Therefore, it is possible to attain energy saving of the fuel cell system by this judgment step S10.

In the normal system, operation of performing scavenging in the first scavenging passage before a system stop may be incorporated as normal stop mode. In the case of such a system, when it is determined in the step S10 the measured temperature 401 exceeds the threshold, only scavenging in the first scavenging passage may be performed immediately before the system stop.

In step S20, the solenoid valves 230 and 515 and the pressure reduction control valve 232 are set in the closed state (or the closed state is checked), and the solenoid valves 234 and 240 are set in the opened state (or the opened state is checked), in order to form the first scavenging passage 600. And the hydrogen pump 210 is operated to start circulation of the fuel-off gas within the first scavenging passage 600. Accordingly, collection processing of the moisture remaining in the first scavenging passage 600 which contains the fuel cell body 1 is performed by using the gas/liquid separator 220.

In step S30, it is determined whether the amount of residual water in the first scavenging passage is less than or equal to a reference value.

When it is determined that the amount of residual water exceeds the reference value, circulation of the fuel-off gas in the first scavenging passage is continuously performed.

On the other hand, when it is determined that the amount of residual water is less than or equal to the reference value, the residual water removing operation in the first scavenging passage is completed and the control shifts to step S40. In this respect, the control unit 4 may use either of the following methods (1) and (2) as a method of determining whether the amount of residual water in the first scavenging passage is less than or equal to the reference value. In the first method (1), the relationship between the operation time of the hydrogen pump and the amount of moisture being removed is stored beforehand in the control unit 4, and, when the operation time of the hydrogen pump reaches a predetermined operation time, the amount of residual water in the first scavenging passage is determined as being less than or equal to the reference value. In the second method (2), a liquid-level sensor is arranged beforehand in the gas/liquid separator, a rate of change of the amount of the removed moisture collected by the circulation of the fuel-off gas in the first scavenging passage is monitored using the sensor, and, when the monitored rate of change is less than or equal to a predetermined value, the amount of residual water in the first scavenging passage is determined as being less than or equal to the reference value. In the case of the first method (1), the relationship between the operation time of the hydrogen pump and the amount of moisture being removed may vary depending on the operating state of the fuel cell, such as an amount of electricity generated in the fuel cell, a cooling water temperature, etc. It is preferred that a plurality of the relationships under various conditions are stored beforehand in the control unit 4.

In step S40, the solenoid valves 234 and 240 are set in the closed state and the solenoid valve 515 is set in the opened state according to the commands from the control unit 4, to form the second scavenging passage 610. Hence, circulation of the fuel-off gas is performed by the hydrogen pump 210 also in the second scavenging passage 610.

In step S50, it is determined whether the amount of residual water in the second scavenging passage 610 is less than or equal to a reference value.

When it is determined that the amount of residual water exceeds the reference value, circulation of the fuel-off gas in the second scavenging passage 610 is continuously performed.

On the other hand, when it is determined that the amount of residual water is less than or equal to the reference value, the residual water removing operation in the second scavenging passage 610 is completed and the fuel cell system is in a stop state.

Also in this step, a method of determining the amount of residual water in the second scavenging passage, which is the same as the above-mentioned method of determining the amount of residual water in the first scavenging passage 600 in the step S30 may be used.

The processing of the above-mentioned steps enables the drying of the component part, such as a hydrogen pump, in the fuel-gas passage 2 to be performed certainly and efficiently.

Figure 3:
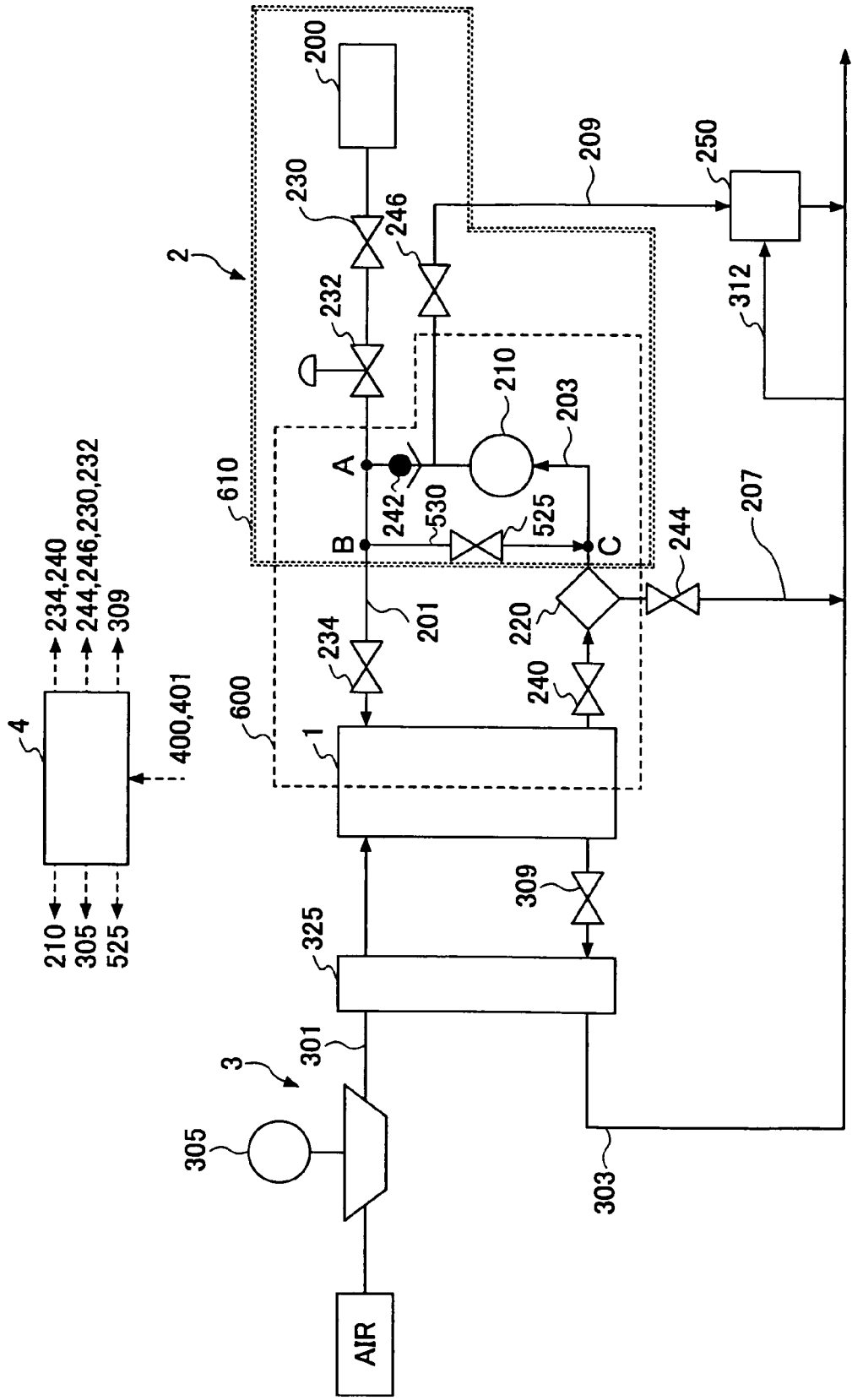
FIG. 3 is a diagram showing the composition of a fuel cell system in a second embodiment of the invention.

FIG. 3 shows the composition of a fuel cell system in a second embodiment of the invention.

In this embodiment, the location of the bypass passage differs from that shown in FIG. 1, and others are the same as those of the previous embodiment of FIG. 1. Specifically, one end of a bypass passage 530 in this embodiment is connected to the fuel-gas feed passage 201 at an intermediate point (junction point B) between the solenoid valve 234 and the junction point A (the junction point of the fuel-gas feed passage 201 and the circulation passage 203). The other end of the bypass passage 530 is connected to the circulation passage 203 at an intermediate point (junction point C) between the hydrogen pump 210 and the gas/liquid separator 220. A solenoid valve 525 is arranged in the bypass passage 530.

Similar to the previous embodiment of FIG. 1, in the fuel cell system of this embodiment, the fuel-off gas is circulated within the first scavenging passage 600 at a time of the first-step moisture removing operation.

However, when the second-step moisture removing is performed in the fuel cell system of this embodiment, the solenoid valves 234 and 240 are set in the closed state and the solenoid valves 230, 246, 525 and the pressure reduction control valve 232 are set in the opened state. Namely, dry hydrogen gas flows into the hydrogen pump 210 via the path containing the high-pressure hydrogen tank 200, the junction point B of the fuel-gas feed passage and the bypass passage 530, and the junction point C of the bypass passage 530 and the circulation passage 203, so that the residual water contained in the hydrogen pump 210 is discharged. The moisture-containing hydrogen gas discharged from the hydrogen pump 210 is discharged via the solenoid valve 246 and the dilution device 250. In the case of this system, a fresh, dry hydrogen gas is used for removing residual water in the hydrogen pump 210, and it is possible to perform efficient moisture removing.

It should be noted that the system stopping operation by the fuel cell system according to the invention is not limited to when stopping the fuel cell system from an operating condition. For example, when the fuel cell system is stopped under a low temperature environment and freezing of the component parts of the system may arise, it is also possible to perform the above-mentioned operation (FIG. 2), if needed.

In this case, hydrogen gas from the high-pressure hydrogen tank 200 may be used as the gas being circulated in the two scavenging passages, instead of the fuel-off gas.

In the above-mentioned embodiments, the example in which drying of the hydrogen pump 210 is performed efficiently has been described. Namely, the composition in which the hydrogen pump 210 and the fuel cell body 1 are contained in the first scavenging passage, and the hydrogen pump 210 is contained in the second scavenging passage but the fuel cell body 1 is not contained therein has been illustrated. However, the two scavenging passages according to the invention are not restricted to such composition. Moreover, the component parts of the system to which the invention is applied are not restricted to the hydrogen pump. For example, the invention may be applied to another component part (a valve, a humidifier, piping, etc.) arranged in the reactive gas passage of the system, and the first scavenging passage may be formed to contain the fuel cell body (whether the component part is contained or not is optional) and the second scavenging passage may be formed to contain the component part without containing the fuel cell body.

The present invention is not limited to the specific structure of the fuel cell system, as in the above-mentioned embodiments, which has been used for the purpose of illustration. It should be noted that, in the actual fuel cell system, other component parts, such as solenoid valves and piping, may be arranged at locations which are not shown in the above-mentioned embodiments, and, conversely, some component parts shown in FIG. 1 or FIG. 3 may be omitted in the actual fuel cell system.

The present application is based upon and claims the benefit of priority of Japanese patent application No. 2005-350551, filed on Dec. 5, 2005, the contents of which are incorporated by reference in their entirety.

The invention claimed is:

1. A fuel cell system, comprising:
    a fuel cell body;
    a gas passage supplying reactive gas to the fuel cell body and discharging the reactive gas from the fuel cell body;
    an adjustment part configured to adjust a flowing condition of the reactive gas in the gas passage;
    at least two scavenging passages scavenging a part of the gas passage, wherein a first scavenging passage is formed to contain the fuel cell body and a second scavenging passage is formed to bypass the fuel cell body; and
    a control unit configured to control operation of the adjustment part to circulate the gas to either the first scavenging passage or the second scavenging passage, wherein the control unit is further configured to:
    start circulating the gas in the first scavenging passage to remove residual water in the first scavenging passage at a start of stopping of the fuel cell system; and
    stop circulating the gas in the first scavenging passage and start circulating the gas in the second scavenging passage to remove residual water in the second scavenging passage after the residual water in the first scavenging passage is removed.

2. The fuel cell system according to claim 1, further comprising a checking unit checking an amount of residual water in the first scavenging passage, wherein, when it is determined that the amount of residual water in the first scavenging passage is less than or equal to a reference value while the gas is circulated in the first scavenging passage, the control unit stops circulating of the gas in the first scavenging passage and starts circulating of the gas in the second scavenging passage.

3. The fuel cell system according to claim 2, further comprising a detection unit detecting a temperature at a predetermined location of the first scavenging passage, and, when the temperature detected by the detection unit is less than or equal to a reference value, the control unit controls operation of the adjustment part to circulate the gas in the first scavenging passage.

4. The fuel cell system according to claim 1, wherein a part of the gas passage discharging the reactive gas includes a circulation passage which returns, to a part of the gas passage supplying the reactive gas, the discharged reactive gas by using a circulating pump, and each of the first and second scavenging passages contains the circulating pump.

5. The fuel cell system according to claim 4, wherein the second scavenging passage includes a bypass passage, one end of the bypass passage is connected to a location of the circulation passage between the circulating pump and the part of the gas passage supplying the reactive gas, and the other end of the bypass passage is connected to a location of the circulation passage between the fuel cell body and the circulating pump.

6. The fuel cell system according to claim 1, wherein at least one of the first and second scavenging passages contains a gas/liquid separator.

7. A method of stopping a fuel cell system, the method comprising the steps of:
providing a fuel cell system including a fuel cell body, a gas passage supplying reactive gas to the fuel cell body and discharging the reactive gas from the fuel cell body, an adjustment part adjusting a flowing condition of the reactive gas in the gas passage, and at least two scavenging passages scavenging a part of the gas passage, wherein a first scavenging passage is formed to contain the fuel cell body and a second scavenging passage is formed to bypass the fuel cell body;
starting circulating the gas in the first scavenging passage to remove residual water in the first scavenging passage at a start of stopping the fuel cell system; and
stopping circulating the gas in the first scavenging passage and starting circulating the gas in the second scavenging passage to remove residual water in the second scavenging passage after the residual water in the first scavenging passage is removed.

8. The method of stopping the fuel cell system according to claim 7, wherein the fuel cell system comprises a detection unit detecting a temperature at a predetermined location, and, when the temperature detected by the detection unit is less than or equal to a reference value, both scavenging in the first scavenging passage and scavenging in the second scavenging passage are performed.

9. The method of stopping the fuel cell system according to claim 7, wherein, when it is determined that an amount of residual water in the first scavenging passage is less than or equal to a reference value, the step of performing scavenging in the first scavenging passage is shifted to the step of performing scavenging in the second scavenging passage.

10. The fuel cell system according to claim 1, wherein the second scavenging passage is scavenged with reactive gas which is not circulated to the fuel cell body.

* * * * *